(12) United States Patent
Spooner

(10) Patent No.: US 8,466,595 B2
(45) Date of Patent: Jun. 18, 2013

(54) HYDROELECTRIC TURBINE

(75) Inventor: Ed Spooner, Bishop Auckland (GB)

(73) Assignee: OpenHydro Group Limited, Dublin (IE)

( * ) Notice: Subject to any disclaimer, the term of this patent is extended or adjusted under 35 U.S.C. 154(b) by 659 days.

(21) Appl. No.: 12/373,489

(22) PCT Filed: Jul. 13, 2007

(86) PCT No.: PCT/EP2007/006258
§ 371 (c)(1),
(2), (4) Date: Oct. 6, 2009

(87) PCT Pub. No.: WO2008/006614
PCT Pub. Date: Jan. 17, 2008

(65) Prior Publication Data
US 2010/0026002 A1    Feb. 4, 2010

(30) Foreign Application Priority Data

Jul. 14, 2006  (EP) .................................. 06014667

(51) Int. Cl.
*H02K 1/12* (2006.01)
(52) U.S. Cl.
USPC ..................... 310/216.002; 290/54
(58) Field of Classification Search
USPC .......................................... 290/54
See application file for complete search history.

(56) References Cited

U.S. PATENT DOCUMENTS

| | | |
|---|---|---|
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 3,209,156 A | 9/1965 | Struble, Jr. |
| 3,292,023 A * | 12/1966 | Kober ...................... 310/156.75 |
| 3,342,444 A | 9/1967 | Nelson |
| 3,355,998 A | 12/1967 | Roemisch |
| 3,384,787 A | 5/1968 | Schwartz |

(Continued)

FOREIGN PATENT DOCUMENTS

| | | |
|---|---|---|
| CA | 2388513 | 8/2000 |
| CA | 2352673 | 1/2003 |

(Continued)

OTHER PUBLICATIONS

U.S. Appl. No. 13/133,235, filed Jun. 7, 2011, including the specification, claims and drawings.

(Continued)

*Primary Examiner* — Joseph Waks
(74) *Attorney, Agent, or Firm* — Gardner, Linn, Burkhart & Flory, LLP

(57) ABSTRACT

A hydroelectric turbine having a stator and a rotor housed concentrically within the stator, the turbine having a circumferentially disposed array of magnets on a rim of the rotor, and wherein the stator is slotless in configuration and is formed from a wire winding as opposed to the conventional toothed laminations, the turbine further having an annular array of individual coils mounted on the stator concentrically inwardly of the wire winding, each coil being provided with a dedicated rectifier to convert AC current induced in the coil into DC, preferably for transmission to a remote location.

16 Claims, 7 Drawing Sheets

U.S. PATENT DOCUMENTS

| | | | |
|---|---|---|---|
| 3,422,275 A | 1/1969 | Braikevitch et al. | |
| 3,477,236 A | 11/1969 | Burrus | |
| 3,487,805 A | 1/1970 | Satterthwaite et al. | |
| 3,708,251 A | 1/1973 | Pierro | |
| 3,986,787 A | 10/1976 | Mouton, Jr. et al. | |
| 3,987,638 A | 10/1976 | Burkhardt et al. | |
| 4,095,918 A | 6/1978 | Mouton et al. | |
| 4,163,904 A | 8/1979 | Skendrovic | |
| 4,219,303 A | 8/1980 | Mouton, Jr. et al. | |
| 4,274,009 A * | 6/1981 | Parker, Sr. | 290/43 |
| 4,367,413 A * | 1/1983 | Nair | 290/52 |
| 4,421,990 A | 12/1983 | Heuss et al. | |
| 4,427,897 A | 1/1984 | Migliori | |
| 4,523,878 A | 6/1985 | Richart et al. | |
| 4,541,367 A | 9/1985 | Lindberg | |
| 4,613,762 A | 9/1986 | Soderholm | |
| 4,720,640 A * | 1/1988 | Anderson et al. | 290/43 |
| 4,740,711 A | 4/1988 | Sato et al. | |
| 4,868,408 A | 9/1989 | Hesh | |
| 4,868,970 A * | 9/1989 | Schultz et al. | 29/596 |
| 4,990,810 A | 2/1991 | Newhouse | |
| 5,495,221 A | 2/1996 | Post | |
| 5,592,816 A | 1/1997 | Williams | |
| 5,606,791 A * | 3/1997 | Fougere et al. | 29/596 |
| 5,656,880 A * | 8/1997 | Clark | 310/268 |
| 5,715,590 A * | 2/1998 | Fougere et al. | 29/564.1 |
| 5,998,905 A * | 12/1999 | Fougere et al. | 310/254.1 |
| 6,109,863 A | 8/2000 | Milliken | |
| 6,166,472 A * | 12/2000 | Pinkerton et al. | 310/208 |
| 6,168,373 B1 | 1/2001 | Vauthier | |
| 6,232,681 B1 * | 5/2001 | Johnston et al. | 310/44 |
| 6,242,840 B1 * | 6/2001 | Denk et al. | 310/216.002 |
| 6,300,689 B1 | 10/2001 | Smalser | |
| 6,367,399 B1 | 4/2002 | Khachaturian | |
| 6,406,251 B1 | 6/2002 | Vauthier | |
| 6,409,466 B1 | 6/2002 | Lamont | |
| 6,445,099 B1 | 9/2002 | Roseman | |
| 6,476,709 B1 | 11/2002 | Wuidart et al. | |
| 6,648,589 B2 | 11/2003 | Williams | |
| RE38,336 E | 12/2003 | Williams | |
| 6,729,840 B2 | 5/2004 | Williams | |
| 6,770,987 B1 * | 8/2004 | Sogard et al. | 310/12.24 |
| 6,777,851 B2 * | 8/2004 | Maslov | 310/254.1 |
| 6,806,586 B2 | 10/2004 | Wobben | |
| 6,957,947 B2 | 10/2005 | Williams | |
| 7,145,280 B2 * | 12/2006 | Noble et al. | 310/254.1 |
| 7,190,087 B2 | 3/2007 | Williams | |
| D543,495 S | 5/2007 | Williams | |
| 7,352,078 B2 | 4/2008 | Gehring | |
| 7,378,750 B2 | 5/2008 | Williams | |
| 7,425,772 B2 | 9/2008 | Novo Vidal | |
| 7,471,009 B2 | 12/2008 | Davis et al. | |
| 7,874,788 B2 | 1/2011 | Stothers et al. | |
| 7,928,348 B2 * | 4/2011 | Neal | 219/628 |
| 2002/0034437 A1 | 3/2002 | Williams | |
| 2003/0044272 A1 | 3/2003 | Addie et al. | |
| 2003/0137149 A1 | 7/2003 | Northrup et al. | |
| 2003/0155829 A1 | 8/2003 | McMullen et al. | |
| 2003/0168864 A1 | 9/2003 | Heronemus et al. | |
| 2003/0193198 A1 | 10/2003 | Wobben | |
| 2003/0218338 A1 | 11/2003 | O'Sullivan et al. | |
| 2004/0021386 A1 | 2/2004 | Swett | |
| 2004/0021437 A1 | 2/2004 | Maslov et al. | |
| 2004/0201299 A1 | 10/2004 | Naritomi et al. | |
| 2004/0227500 A1 | 11/2004 | O'Meara | |
| 2004/0232792 A1 * | 11/2004 | Erfourth | 310/156.38 |
| 2004/0262926 A1 | 12/2004 | Hansen | |
| 2005/0005592 A1 | 1/2005 | Fielder | |
| 2005/0031442 A1 | 2/2005 | Williams | |
| 2005/0242679 A1 * | 11/2005 | Walter et al. | 310/181 |
| 2006/0261597 A1 | 11/2006 | Gehring | |
| 2007/0018459 A1 | 1/2007 | Williams | |
| 2007/0063448 A1 | 3/2007 | Kowalczyk | |
| 2007/0075593 A1 * | 4/2007 | Petro et al. | 310/12 |
| 2007/0164626 A1 | 7/2007 | Taniguchi et al. | |
| 2007/0241566 A1 | 10/2007 | Kuehnle | |
| 2007/0262668 A1 | 11/2007 | Brisson et al. | |
| 2007/0291426 A1 | 12/2007 | Kasunich et al. | |
| 2008/0012538 A1 | 1/2008 | Stewart et al. | |
| 2009/0278357 A1 | 11/2009 | Williams | |
| 2010/0025998 A1 | 2/2010 | Williams | |
| 2010/0068037 A1 | 3/2010 | Ives | |
| 2010/0133838 A1 | 6/2010 | Borgen | |
| 2010/0172698 A1 | 7/2010 | Ives et al. | |
| 2010/0201129 A1 | 8/2010 | Holstein et al. | |
| 2010/0232885 A1 | 9/2010 | Ives et al. | |
| 2010/0295388 A1 | 11/2010 | Ives et al. | |
| 2011/0018274 A1 | 1/2011 | Ives et al. | |
| 2011/0088253 A1 | 4/2011 | Ives et al. | |
| 2011/0110770 A1 | 5/2011 | Spooner et al. | |
| 2011/0291419 A1 | 12/2011 | Dunne et al. | |
| 2011/0293399 A1 | 12/2011 | Dunne et al. | |
| 2011/0298216 A1 | 12/2011 | Ives et al. | |
| 2011/0304148 A1 | 12/2011 | Dunne et al. | |
| 2012/0027522 A1 | 2/2012 | Ives et al. | |
| 2012/0175877 A1 | 7/2012 | Ives et al. | |
| 2012/0187680 A1 | 7/2012 | Spooner et al. | |
| 2012/0235412 A1 | 9/2012 | Dunne et al. | |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924500 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 62160047 A * | 7/1987 |
| JP | 63055370 | 3/1988 |
| JP | 01043908 | 2/1989 |
| JP | 2000341818 | 12/2000 |
| JP | 2005069025 | 3/2005 |

| | | |
|---|---|---|
| JP | 2005248822 | 9/2005 |
| JP | 2006094645 | 4/2006 |
| JP | 2007255614 | 10/2007 |
| JP | 2007291882 | 11/2007 |
| WO | 9844372 | 10/1998 |
| WO | 9852819 | 11/1998 |
| WO | WO9966623 | 12/1999 |
| WO | 0077393 | 12/2000 |
| WO | 0134973 | 5/2001 |
| WO | 0134977 | 5/2001 |
| WO | WO02099950 | 12/2002 |
| WO | 03014561 | 2/2003 |
| WO | WO03025385 | 3/2003 |
| WO | 03046375 | 6/2003 |
| WO | 2004015264 | 2/2004 |
| WO | 2004027257 | 4/2004 |
| WO | 2004107549 | 12/2004 |
| WO | 2004113717 | 12/2004 |
| WO | 2005045243 | 5/2005 |
| WO | 2005061887 | 7/2005 |
| WO | 2005078233 | 8/2005 |
| WO | 2005080789 | 9/2005 |
| WO | 2005116443 | 12/2005 |
| WO | 2006029496 | 3/2006 |
| WO | 2007043894 | 4/2007 |
| WO | 2007055585 | 5/2007 |
| WO | 2007083105 | 7/2007 |
| WO | 2007086814 | 8/2007 |
| WO | 2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | 2010118766 | 10/2010 |
| WO | 2011039249 | 4/2011 |
| WO | 2011039255 | 4/2011 |
| WO | 2011039267 | 7/2011 |

OTHER PUBLICATIONS

U.S. Appl. No. 13/133,805, filed Jun. 9, 2011, including the specification, claims and drawings.
U.S. Appl. No. 13/133,504, filed Jun. 8, 2011, including the specification, claims and drawings.
U.S. Appl. No. 13/133,507, filed Jun. 8, 2011, including the specification, claims and drawings.
U.S. Appl. No. 13/133,832, filed Jun. 9, 2011, including the specification, claims and drawings.
U.S. Appl. No. 13/264,667, filed Oct. 14, 2011, including the specification, claims and drawings.
Michael Owens, Homopolar Electro-mechanical Rotary Power Converter (HERPC), IEEE Melecon 2004, May 12-15, Dubrovnik Croatia.
PCT International Search Report for International Application No. PCT/EP2007/006258 dated Aug. 23, 2007.
PCT Written Opinion of International Searching Authority (Aug. 23, 2007).
PCT Request for Processing of International Application (Jul. 13, 2007).

* cited by examiner

HYDROELECTRIC TURBINE

FIELD OF THE INVENTION

The present invention is concerned with a hydroelectric turbine for the generation of electricity, and in particular to an open-centre hydroelectric turbine adapted to generate electricity from ocean currents and/or tidal streams.

BACKGROUND OF THE INVENTION

Power take off from an open-centre hydroelectric turbine is most conveniently arranged by means of an electrical generator of rim construction located at the outer edge of the rotor and inner edge of the stator. In such cases the generator is a synchronous machine of high pole number. The field system may use electrical coils supplied with current or a set of permanent magnets to provide the magneto motive force required to drive magnetic flux through the magnetic circuit. This arrangement gives a large diameter open space in the centre of the stator that accommodates the rotor. The rim generator operates at the same rotational speed as the turbine and requires no gearing.

Directly-Driven (i.e. gearless) Generators with Permanent-Magnet field excitation (DDPMGs) offer the simplest and potentially most reliable and cost-effective form of power take-off device for renewable energy systems.

The majority of DDPMG designs employ a magnetic circuit created by a set of magnets on the rotor forming a radial magnetic field within a narrow gap separating the rotor and stator. The stator is usually of essentially conventional construction and includes an electrical circuit based on insulated coils intertwined within slots in the bore of a cylindrical laminated iron stator and resembles the stator of an induction or synchronous machine. The magnetic circuit is coupled to the electrical circuit by virtue of the location of the rotor within the stator. The magnetic circuit normally includes ferromagnetic sections made of iron or steel to provide a path of low reluctance for the passage of magnetic flux. Such sections are usually provided within both the rotor and stator.

The magnetic field established by the field system passes across the gap that separates the rotor and stator. Relative movement of the rotor, and therefore magnetic field, with respect to the stator, and therefore the stator coils of the electric circuit, causes an electromotive force (EMF) to be induced in the coils. However, the flux linkage with any other circuit within the stator also undergoes changing flux linkage and emf is induced. In order to avoid unwanted current flowing in the magnetic iron or steel of the stator, which results in power loss, it is usual to construct the core of the stator, onto which the coils are wound, from thin sheets of magnetic iron or steel separated by electrical insulation. The sheets are called laminations and are cut to shape by a punching process. Insulation is usually provided by a thin coating to one or both sides of the sheet from which the lamination is punched. The armature coils are usually attached to the laminated magnetic core by forming slots during the punching process. The coils have to be inserted and secured in the slots and this process stresses the winding insulation, and often means that thicker insulation is needed than would be required simply for electrical isolation.

Where small numbers of machines are required the cost of producing the die for punching the laminations can be an important component of the final machine cost and the time taken to make the special die can delay construction. In addition, the material removed from the centre of the punched lamination is wasted, which represents a considerable cost.

In hyrdoelectric applications it is desirable to use a large-diameter machine, which can lead to improved efficiency and reduced use of electromagnetically-active material. However, for machines of large diameter it is necessary to construct the laminations as a set of arc segments, because it is not possible to obtain magnetic steel sheet in sufficient size for producing a complete ring. The arcs must be housed in a supporting structure. This adds significant cost to the machine.

This laminated, slotted stator arrangement results in the formation of teeth which project towards the rotor, thus resulting in the rotor being attracted toward a preferred angular position, an effect known as "cogging", which then requires considerable drive torque to start the rotor. Furthermore, the large radial attraction force between rotor and stator requires a massive stiff supporting structure.

The present invention has therefore been developed with a view to mitigating the above mentioned problems.

SUMMARY OF THE INVENTION

The present invention therefore provides a hydroelectric turbine comprising a rotor; an array of magnets disposed about an outer rim of the rotor and forming a radial magnetic field; a slotless stator concentrically surrounding the rotor and comprising a ferromagnetic wire winding which defines a magnetic flux return path for the magnets; and a plurality of coils on the stator.

Preferably, the coils are disposed radially inwardly of the wire winding.

Preferably, the individual coils are mechanically attached to the stator without being intertwined therewith.

Preferably, the coils are not intertwined with one another.

Preferably, the coils are arranged side by side to define an annular array concentrically surrounding the array of magnets.

Preferably, the induced electromotive force in the coils are not all of the same phase.

Preferably, each coil is bonded to the stator.

Preferably, each coil is wound along a substantially obround path.

Preferably, each coil is provided with a dedicated rectifier.

Preferably, the rectifiers are mounted on the stator.

Preferably, each rectifier is mounted in close proximity to the respective coil.

Preferably, each coil is encased in a fluid tight coating or housing.

Preferably, each coil and respective rectifier are encased together in a fluid tight coating or housing.

Preferably, the coating or housing is electrically insulating.

Preferably, each rectifier comprises a diode bridge or half bridge.

Preferably, the rectifiers feed to a common DC output.

Preferably, the rectifiers are connected together to form a plurality of groups in each of which the rectifiers are connected in parallel, the plurality of groups being connected together in series.

Preferably, the stator winding is formed from non-insulated wire.

As used herein, the term "slotless" is intended to refer to the configuration of the stator of an electric generator, and in particular the absence of the conventional slots formed about the inner edge of the bore of cylindrical laminated iron core, and through which slots insulated copper coils are conventionally wound.

BRIEF DESCRIPTION OF THE DRAWINGS

The present invention will now be described with reference to the accompanying drawings, in which.

DETAILED DESCRIPTION OF THE DRAWINGS

Referring now to the accompanying drawings, there is illustrated a hydroelectric turbine, generally indicated as 10, for use in generating electricity, primarily from tidal currents and/or ocean currents, although the turbine 10 may have other applications, for example within a hydroelectric dam (not shown) or the like. As will become clear from the following description, the turbine 10 embodies a number of distinct benefits over prior art equivalents, in particular improved reliability, lower costs, and a lighter weight construction.

Figure 1:
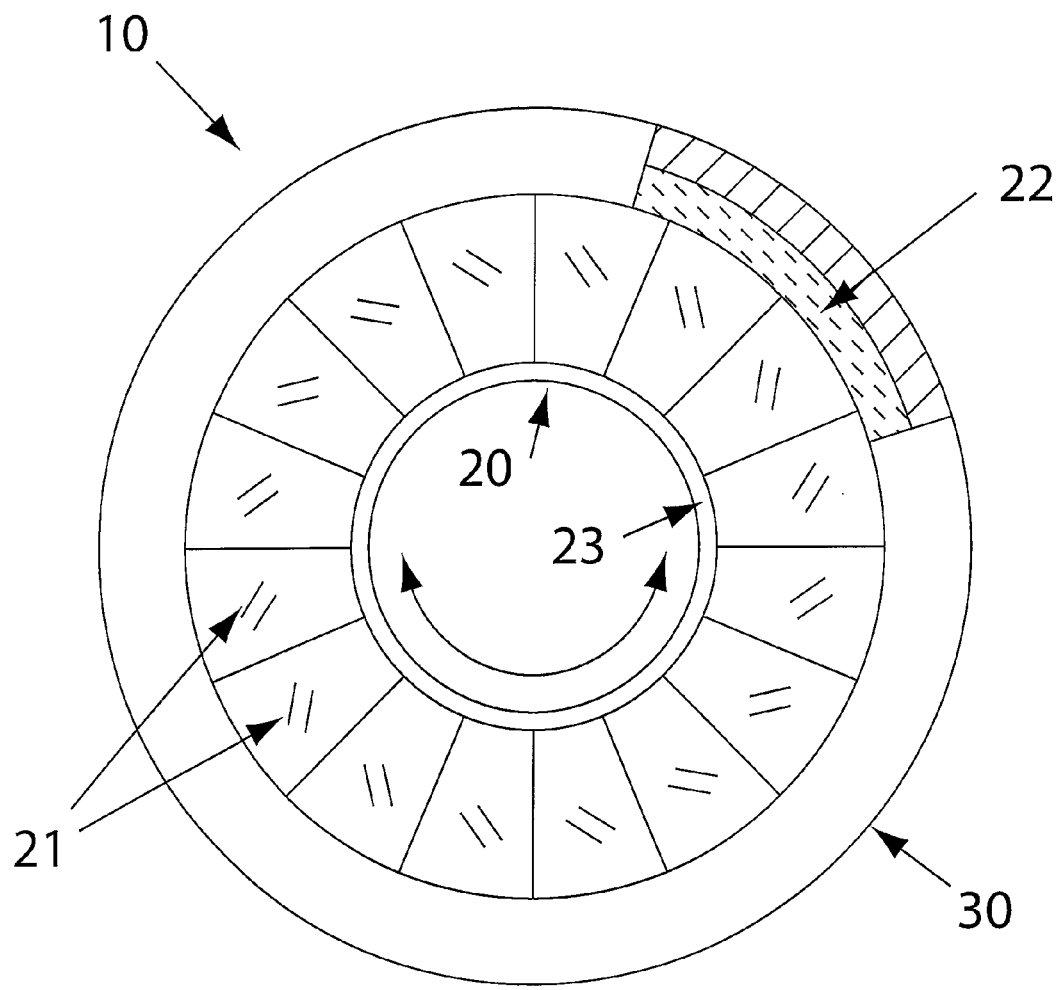
FIG. 1 illustrates a perspective view of a hydroelectric turbine according to a preferred embodiment of the present invention.
Figure 2:
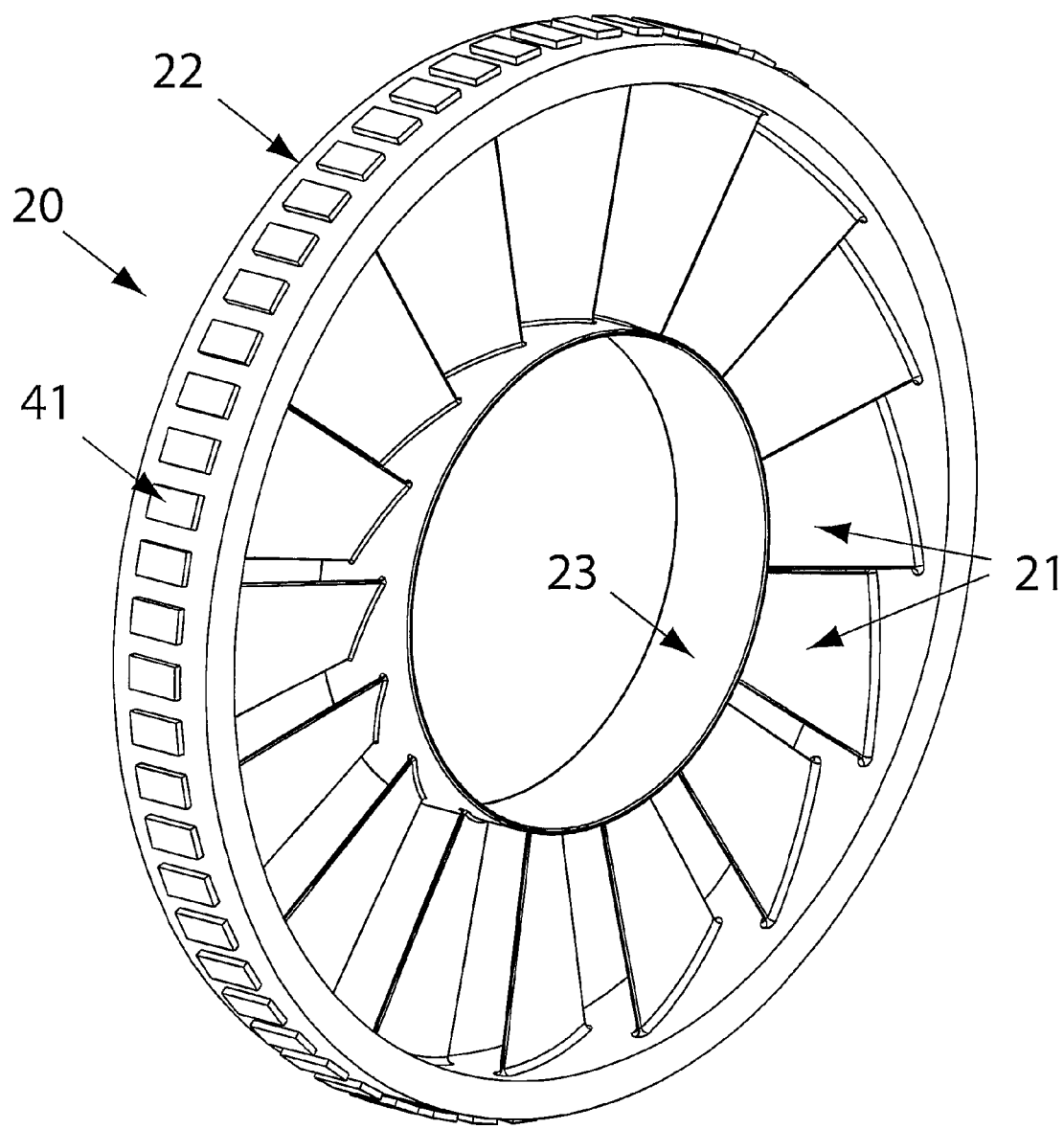
FIG. 2 illustrates a perspective view of a rotor forming part of the hydroelectric turbine of the present invention.

Referring in particular to FIG. 2, the turbine 10 comprises a rotor 20 housed for rotation within a stator 30. The rotor 20 is of an open centre design, and includes an inner rim 23 which defines said open centre. The rotor 20 further comprises an array of generally radially extending blades 21 captured between the inner rim 23 and an outer rim 22. The rotor 20 further comprises an array of magnets 41, preferably permanent magnets, disposed about the outer rim 22. The magnets 41 are polarised alternately north and south in the circumferential direction. The array of magnets 41 are preferably seated on an annular ring (not shown) of ferromagnetic material.

Figure 3:
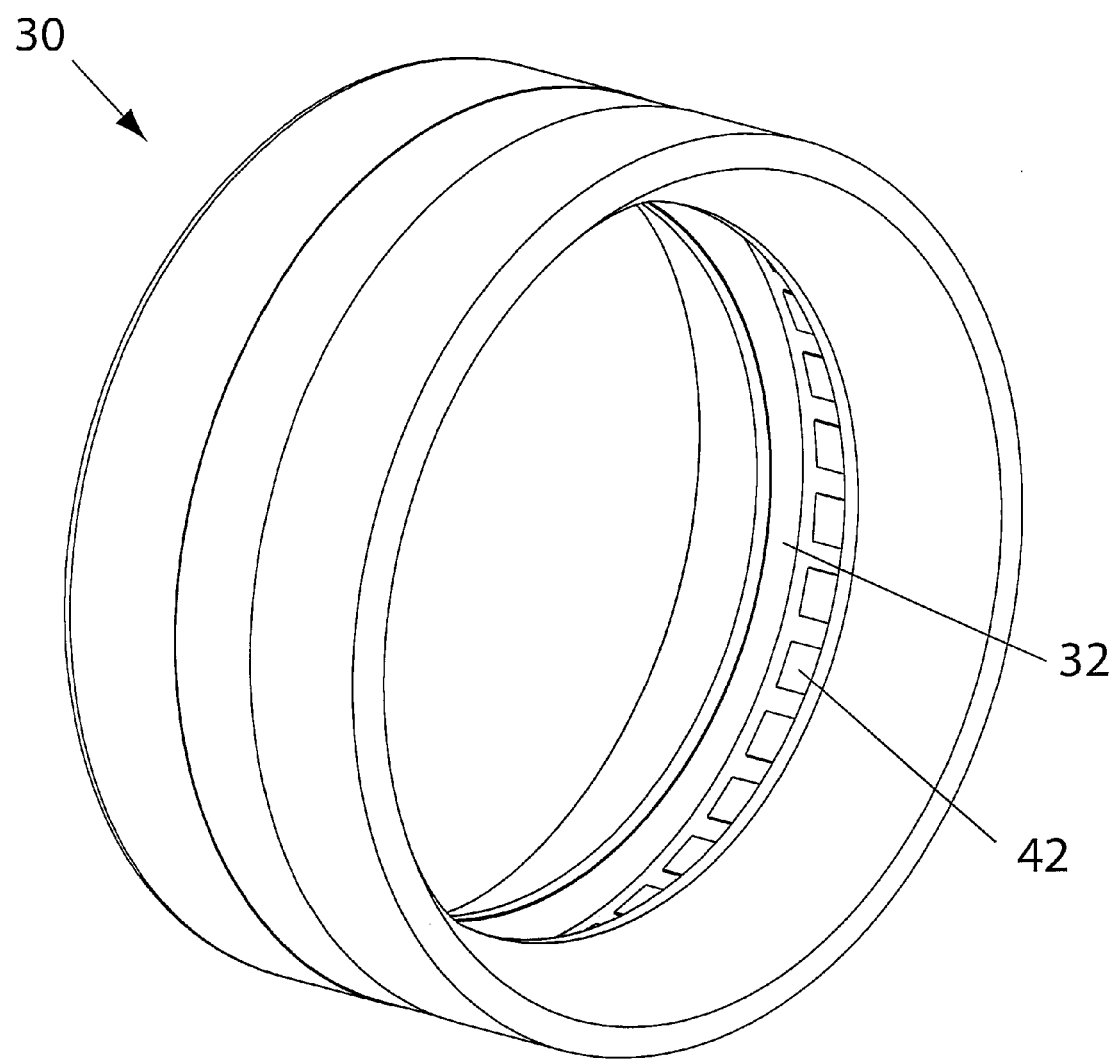
FIG. 3 illustrates a perspective view of a stator forming a further part of the hydroelectric turbine of the invention.
Figure 4:
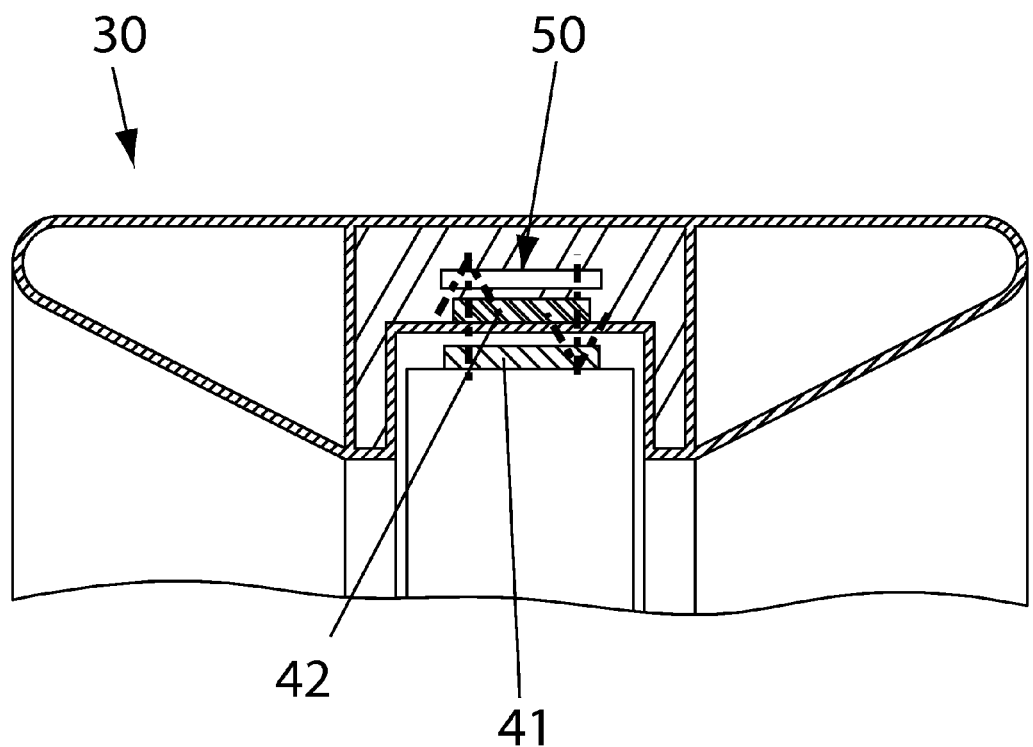
FIG. 4 illustrates a sectioned view of the stator of FIG. 2.

Referring now to FIGS. 3 and 4, it can be seen that the stator 30, in cross section, defines a venturi, at the throat of which is provided an annular channel 32 in which, in use, the rotor 20 is seated. The venturi cross section of the stator 30 effects acceleration of water flowing through the stator 30, in order to increase the speed of rotation of the rotor 20. This venturi cross section is not however essential to the operation of the invention. Any suitable form of bearings may be provided between the rotor 20 and the stator 30, in order to facilitate the smooth running of the rotor 20. As with the rotor 20, the stator 30 may be formed from any suitable material, and in the preferred embodiment illustrated, is formed substantially from GRP.

Figure 5:
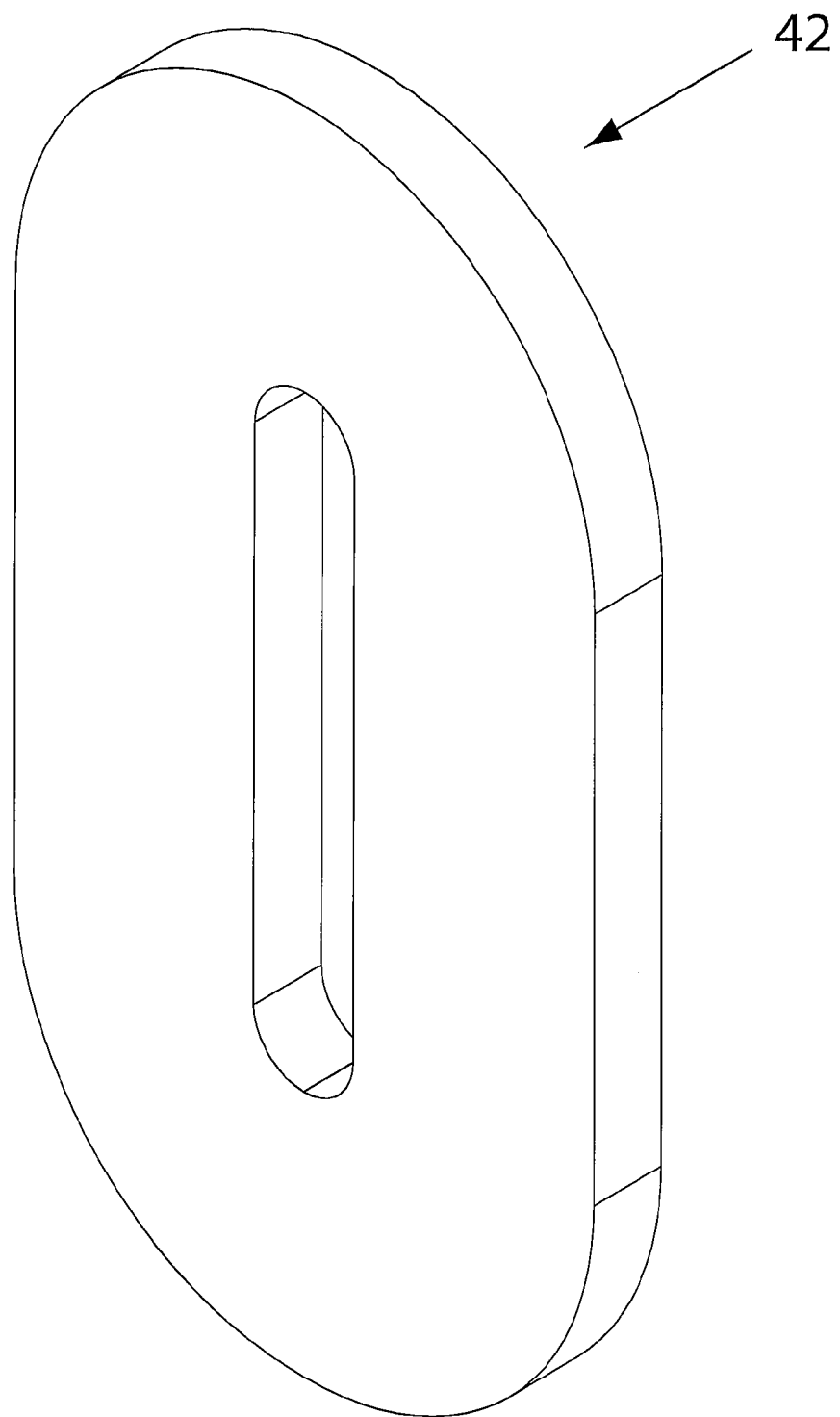
FIG. 5 illustrates a perspective view of a coil forming part of the turbine of the present invention.

Fixed to the stator 30, within the channel 32, is an annular array of individual coils 42, an example of one of which is illustrated in FIG. 5. The configuration and operation of the array of coils 42 will be described in greater detail hereinafter. Wound concentrically about the array of coils 42, radially outwardly thereof, is a ferromagnetic winding 50, preferably formed from iron wire. The winding 50 provides, in use, a magnetic flux return path (shown as broken arrows in FIG. 4) on the stator 30 for the magnetic fields generated by the magnets 41, in addition to preferably providing structural strength to the stator 30. This further facilitates the use of lightweight material in the production of the stator 30.

In use, the rotor 20 is seated within the channel 32 of the stator 30, and thus the coils 42 concentrically surround the magnets 41, with a relatively narrow gap therebetween. In a conventional electric motor/generator, this gap is known as the airgap, but during operation the turbine 10 is submersed under water, and thus the gap is filled with water as opposed to air. The magnets 41 generate a radially extending magnetic field which crosses the gap between the outer rim 22 and the stator 30, with the winding 50 forming the magnetic flux return path. As water flows through the turbine 10, effecting rotation of the rotor 20, the radially extending magnetic field, which preferably alternates between north and south between adjacent magnets 41, will cut through the coils 42, inducing an alternating EMF in each coil 42. It is these induced AC EMF's that provide the electrical power output from the turbine 10, as will be described hereinafter in detail.

As mentioned above, the stator 30 employs a wire winding 50 in place of the conventional slotted and laminated stator arrangement, in order to provide the magnetic flux return path for the magnetic field generated by the magnets 41. This arrangement has been found to have a number of beneficial results, which are particularly advantageous when used in hydroelectric applications. The absence of a slotted and laminated iron core, or more particularly the inclusion of the unbroken annular winding 50, eliminates "cogging" of the rotor 20. "Cogging" is a phenomenon experienced in motors/generators having a conventional slotted stator arrangement, whereby the rotor magnets seek alignment with the stator teeth, resulting in the rotor being attracted towards a preferred position. This phenomenon thus results in an increase in the start-up torque of such conventional motors/generators. By eliminating this "cogging" via the inclusion of the slotless winding 50, the rotor 20 has a lowered start-up torque, and is therefore capable of starting in low velocity flows, as would be found in tidal applications, which will not generate much torque in the rotor 20. In addition, the turbine 10 can extract power over the full tidal cycle.

Furthermore, the omission of the slotted and laminated stator arrangement significantly reduces the cost and complexity of stator 30, while the use of the wire winding 50 is relatively inexpensive and straightforward to produce. A further advantage arises from the placement of the winding 50 radially outwardly of the array of coils 42. This configuration creates a larger gap for the magnetic flux to cross from the magnets 41, thus reducing the magnetic flux density across said gap. While this would initially appear as a disadvantage, it does result in a reduced attraction force between the stator 30 and rotor 20. This reduces the required stiffness of the rotor 20 and stator 30 in order to resist said attractive force, and thus resist deformation. As a result, the rotor 20 and stator 30 can be produced as relatively lightweight components, significantly reducing the cost of same, while simplifying the transport and manoeuvring of same. This can be a significant benefit given the overall dimensions of the turbine 10, which may be approximately 10 meters or greater in diameter. The use of the iron wire winding 50 further eliminates waste during the production of same, which is a significant factor when producing slotted laminated windings, in particular for large scale machines such as the turbine 10.

Regardless of the type of armature employed in electric generators/motors, the coils in which EMF is induced, and which are generally formed of copper wire, are conventionally wound in complex overlapping patterns to form a web surrounding the rotor. These coils are normally configured to provide a three-phase AC output. In the case of a slotless armature, it is conventional practice to provide some form of frame or loom on which to wind the above-mentioned coils. The present invention however provides an entirely different and significantly improved configuration for the electrical circuit of the turbine 10. Referring in particular to FIGS. 3 and 4, it can be seen that the electrical circuit consists of a large number of the coils 42 arranged side by side in an annular array within the channel 24. The number of coils 42 may vary depending on the requirements of the turbine 10. In addition, each coil 42 is provided with its own rectifier 71, preferably a single phase bridge rectifier 71 (shown only in the FIG. 6 circuit diagram), such that the induced AC current in each coil 42 is immediately rectified to DC, with the output from each combined coil 42 and rectifier 71 then being connected to a common DC output for the turbine 10. The above-mentioned features have proven to be significantly advantageous, in particular for hydroelectric applications, the reasons for which are set out hereinafter. An alternative circuit (not shown) could use a half bridge rectifier (not shown) for each coil 42. With such an arrangement each rectifier would comprise a pair of diodes one of which is connected between one terminal of the respective coil and the positive dc output terminal and the other diode connected between the same terminal of the coil and the negative dc output terminal, with the other terminal of the coil being connected to a common point to which all the other coils are connected.

The coils 42 are preferably of insulated copper wire or rectangular strip wound around an obround or "race track" path, for ease of construction and to provide the necessary length of copper wire in each coil 42 which is perpendicularly cut by the magnetic field of the rotor 20. The coils 42 preferably have an electrically insulating core or form (not shown) of generally elongate rectangular shape, onto and around which the copper wire or strip is wound in order to provide the "race track" shape. The number of turns in each coil 42 can be selected such that the voltage generated is less than the rating of commercially available, and preferably low cost, rectifiers 71, even if the rotor 20 speeds up to it's maximum due to disconnection of the load (not shown) being supplied by the turbine. The use of the simple diode based rectifiers 71 has also been facilitated by recognising that the winding 50 has a significantly lower reactance than a conventional laminated slotted armature, enabling the diode based rectifiers 71 to be used without incurring unacceptable voltage drop in the impedance of the coils 42. This arrangement of a dedicated rectifier 71 for each coil 42, positioned alongside or in close proximity to the coil 42, enables the first AC to DC conversion stage of an AC-DC-AC conversion system to be carried out at the turbine 10, with the power then being transmitted as DC to a convenient location for the final conversion back to three phase AC at fixed voltage and frequency for grid connection.

As the coils 42 are not provided as a complex web intertwined about the stator 30, the cost and complexity of producing the electric circuit of the stator 30 is significantly reduced. In particular, each of the coils 42 is provided as a physically separate unit, which therefore enables each coil 42 to be produced off site, and thus accurately yet inexpensively. During manufacture, the coils 42 can also be coated in electrical insulation (not shown) preferably in the form of a resin in which the coils 42 can be dipped or otherwise coated or housed. This coating or casing preferably provides electrical insulation of the coils 42 from earth or ground.

Further advantageously, during this insulating process, the dedicated rectifier 71 for each coil 42 can be electrically connected, in series, to the coil 42, and positioned alongside same, in order to be simultaneously coated in the resin, and thus be effectively physically integrated with the coil 42 as a single unit. The coated coil 42 and rectifier 71 then resembles a relatively thin rectangular slab with a simple two wire output (not shown) projecting from same. Similarly the process for producing a single coil 42 and rectifier 71 unit could be used to produce a group of coils 42 with their associated rectifiers 71 to form a module in the form of a short arc. Again such a module could be produced separately from the overall turbine 10, and preferably under clean conditions, and if required using vacuum pressure impregnation facilities that would have to be impractically large and expensive if used to produce a full annular array of the coils 42 for the entire turbine 10.

This arrangement has a number of benefits compared with the conventional arrangement in which coils are connected to produce a three phase output which is passed to a separate three phase rectifier circuit, namely:

The conventional interconnections between the coils are eliminated

The rectifiers 71 isolate any coil 42 that suffers a fault, allowing the remaining healthy coils 42 to operate The cost is lower than a conventional arrangement due to the use of mass produced low cost single phase rectifiers 71 compared with more highly rated components for a separate single full power three phase rectifier The single phase bridge rectifier 71 located alongside each coil 42 can be integrated in such a way that it shares in the cooling arrangement provided for the coils 42 so that separate rectifier cooling provision is unnecessary Each coil 42 may be wound with two or more conductors in parallel in order to reduce the size of conductor required so that eddy currents within the conductor and the resulting loss are kept to an acceptable level. In such cases each conductor of the coil 42 may be given a separate rectifier bridge. In the event of the failure of one conductor or its rectifier, the other conductors of the coil 42 may continue to operate Mounting the array of coils 42 to the stator 30 is then a simple task of adhering the resin-coated coils 42 in side by side alignment within the channel 32, in order to create the annular array illustrated. This is fundamentally different to the conventional configuration of coil windings on a slotted stator, which requires a complex winding pattern to be employed. It will thus be appreciated that unlike in a conventional winding arrangement, the individual coils 42 are not intertwined with the stator 30, or more particularly the winding 50 providing the magnetic flux return path, nor are they intertwined with one another. This arrangement significantly reduces the complexity of producing the finished stator 30, thus reducing the time and cost of manufacturing same.

The output from each coil 42 is then connected to a common DC output for the turbine 10, as will be described in greater detail below. Each coil 42 is preferably mounted such as to be disposed in a plane which is substantially tangential to the point on the channel 32 against which the coil 42 is mounted. The electrically insulating coating of each coil 42 and associated rectifier 71 is also preferably adapted to provide a hermetic seal thereabout, enabling the turbine 10 to be submersed under water. Thus each coil 42 is simultaneously electrically insulated and hermetically sealed during the offsite manufacture of same, thereby eliminating further sealing once the coils 42 are installed on the stator 30. This again simplifies the assembly of the turbine 10, and reduces the cost of same. The precision to which the combined coil 42 and rectifier 71 unit can be manufactured is also greatly increased by this separate manufacturing process. In particular the units can be manufactured under clean conditions, and if necessary utilising vacuum pressure impregnation facilities.

Figure 6:
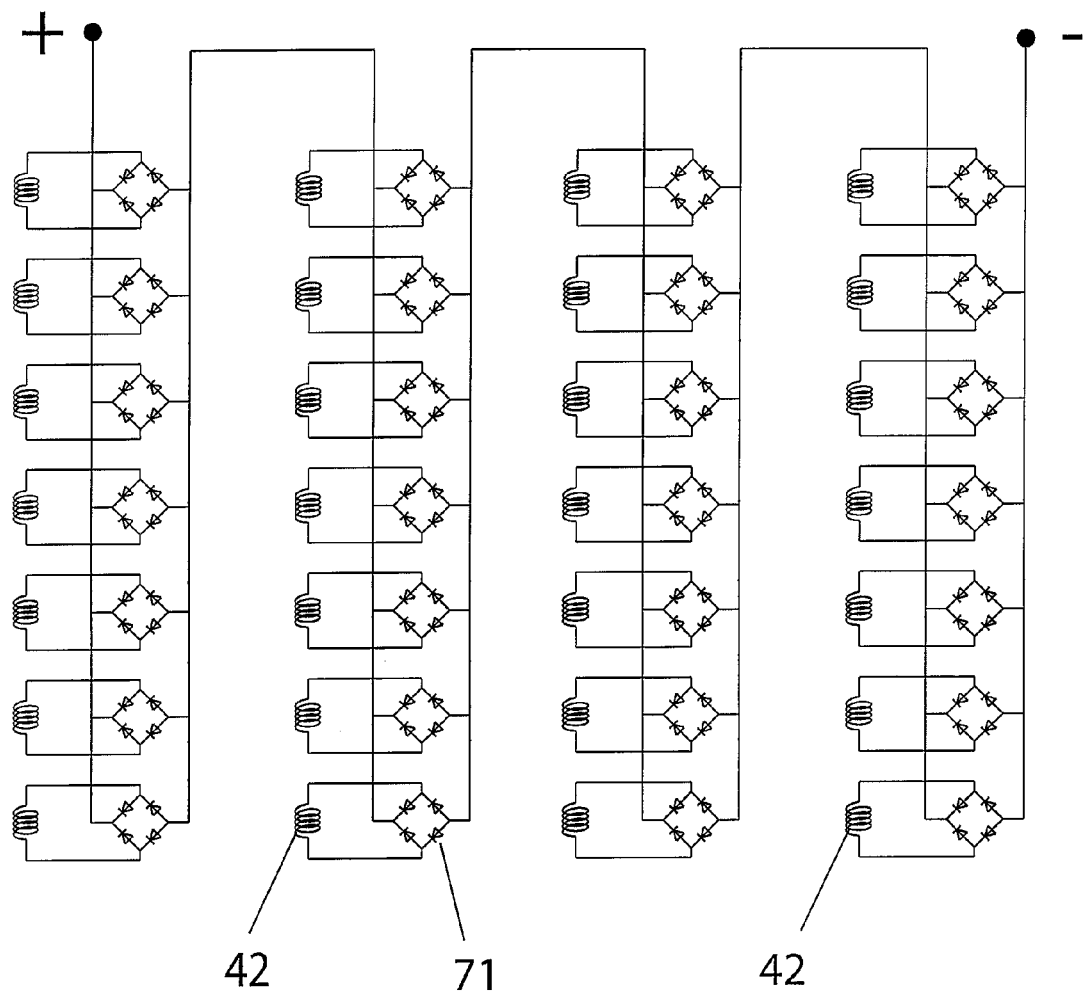
FIG. 6 illustrates a circuit diagram of the array of coils forming part of the turbine of the present invention.

Referring then to FIG. 6, there is illustrated a circuit diagram representing the electric circuit of the stator 30 as defined by the plurality of coils 42 and associated rectifiers 71. It will however be appreciated that the number of coils 42 included in the circuit diagram of FIG. 6 is not necessarily representative of the number of coils 42 which may actually be provided on the stator 30. In addition, the circuit diagram illustrated is intended only to show a preferred configuration for the connections between the coils 42 and rectifiers 71, and it should be appreciated that any other suitable configuration may be employed. It can be seen that in the preferred embodiment illustrated, the array of coils 42, and thus the respective rectifiers 71, are arranged in four series groups, each group including seven coils 42 connected in parallel to one another. The number of coils 42 in each group, and the number of groups chosen, is dictated by the desired voltage and/or current at the common DC output. Thus the number of coil/rectifier units 30 in parallel will dictate the total current, while the number of groups in series will dictate the total voltage. The arrangement may vary depending on the number of coils 42 forming part of the turbine 10, and the voltage and/or current generated within each coil 42, which will be dependent on a number of factors, not least the magnetic flux density cutting through each coil 42, and the number of turns in each coil 42. The desired voltage and current at the common DC output for the turbine 10 may also be varied depending on the application in question. For example, if the turbine 10 is located offshore, and must transmit the power generated along a five kilometre stretch of subterranean cable, it is likely that a voltage in the range of 10,000 volts would be required, in order to drive the current along this length of cable in order to avoid unacceptable power loss in a cable of economical cross section.

It will be appreciated from FIG. 6 that the use of a large array of coils 42, connected in the configuration illustrated, ensures a high degree of redundancy of the coils 42. Thus if a particular coil 42 or associated rectified 71 was to fail, the overall effect on the power generating capabilities of the turbine 10 would be relatively small, and in any event would not prevent the continuing operation of the turbine 10. Furthermore, the use of a large number of the coils 42 provides a smooth DC output because the EMF from the coils 42 are not all of the same phase.

Figure 7:
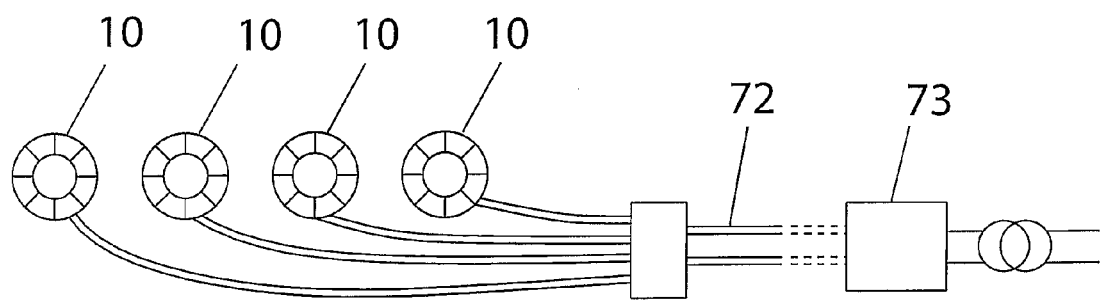
FIG. 7 illustrates a schematic illustration of a tidal farm containing a plurality of the hydroelectric turbines of the present invention.

Referring to FIG. 7, the turbine 10 may be provided as part of a tidal farm including a plurality of the turbines 10 whose outputs are connected in parallel, to a common cable 72 for feeding power back to shore or any other desired location. For the purpose of feeding the power into a utility grid or the like, a high voltage DC input inverter 73 is preferably provided. If the transmission distance is shorter, the turbine 10 may be configured to generate a lower voltage DC, for example 1000V to 1500V, and final conversion to AC for grid connection may be by an inverter (not shown) similar to those used in electrical drive applications.

The invention claimed is:

1. A hydroelectric turbine comprising a rotor; an array of magnets disposed about an outer rim of the rotor and forming a radial magnetic field; a slotless stator concentrically surrounding the rotor and comprising a ferromagnetic wire winding which defines a magnetic flux return path for the magnets, the stator winding being formed from non-insulated iron wire; and a plurality of coils on the stator.

2. A turbine according to claim 1 in which the coils are disposed radially inwardly of the wire winding.

3. A turbine according to claim 1 in which the individual coils are mechanically attached to the stator without being intertwined therewith.

4. A turbine according to claim 1 in which the coils are not intertwined with one another.

5. A turbine according to claim 1 in which the coils are arranged side by side to define an annular array concentrically surrounding the array of magnets.

6. A turbine according to claim 1 in which the induced electromotive force in the coils are not all of the same phase.

7. A turbine according to claim 1 in which each coil is bonded to the stator.

8. A turbine according to claim 1 in which each coil is provided with a dedicated rectifier.

9. A turbine according to claim 8 in which the rectifiers are mounted on the stator.

10. A turbine according to claim 8 in which each coil and respective rectifier are encased together in a fluid tight coating or housing.

11. A turbine according to claim 8 in which each rectifier comprises a diode bridge or half bridge.

12. A turbine according to claim 8 in which the rectifiers are connected to a common DC output.

13. A turbine according to claim 8 in which the rectifiers are connected together to form a plurality of groups in each of which the rectifiers are connected in parallel, the plurality of groups being connected together in series.

14. A turbine according to claim 1 in which each rectifier is mounted in close proximity to the respective coil.

15. A turbine according to claim 1 in which each coil is encased in a fluid tight coating or housing.

16. A turbine according to claim 15 in which the coating or housing is electrically insulating.

\* \* \* \* \*